US012190827B2

(12) United States Patent
Pyun et al.

(10) Patent No.: US 12,190,827 B2
(45) Date of Patent: Jan. 7, 2025

(54) DISPLAY DEVICE AND METHOD OF DRIVING THE SAME

(71) Applicant: SAMSUNG DISPLAY CO., LTD., Yongin-si (KR)

(72) Inventors: Ki Hyun Pyun, Yongin-si (KR); Jung Eon An, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/364,072

(22) Filed: Aug. 2, 2023

(65) Prior Publication Data

US 2023/0386414 A1 Nov. 30, 2023

Related U.S. Application Data

(63) Continuation of application No. 17/566,489, filed on Dec. 30, 2021, now Pat. No. 11,756,489.

(30) Foreign Application Priority Data

May 20, 2021 (KR) ........................ 10-2021-0065092

(51) Int. Cl.
*G09G 3/3275* (2016.01)

(52) U.S. Cl.
CPC ... *G09G 3/3275* (2013.01); *G09G 2300/0842* (2013.01); *G09G 2310/0286* (2013.01);
(Continued)

(58) Field of Classification Search
CPC ......... G09G 3/3275; G09G 2300/0842; G09G 2310/0286; G09G 2310/061; G09G 2310/08; G09G 2360/147
See application file for complete search history.

(56) References Cited

U.S. PATENT DOCUMENTS 8,817,008 B2 * 8/2014 Park .................... G09G 3/3233 345/212
10,102,801 B2 10/2018 Jin
(Continued)

FOREIGN PATENT DOCUMENTS

KR 10-0858613 9/2008
KR 10-1040786 6/2011
KR 10-2016-0078634 7/2016

OTHER PUBLICATIONS

Hai-Jung In, et al., "External Compensation of Nonuniform Electrical Characteristics of Thin-Film Transistors and Degradation of OLED Devices in AMOLED Displays", IEEE Electron Device Letters, USA, vol. 30, No. 4, Apr. 1, 2009, pp. 377-379.
(Continued)

*Primary Examiner* — Kenneth B Lee, Jr.
(74) *Attorney, Agent, or Firm* — F. Chau & Associates, LLC

(57) ABSTRACT

A display device includes a sensor, a timing controller, and a data driver. The sensor senses characteristic values of an element included in a pixel of the display device using input initialization and data voltages in a sensing period of one frame period. The timing controller calculates compensation data voltage using the characteristic values, and calculate adjusted initialization and data voltages in the sensing period by using the compensation data voltage. The data driver output the adjusted initialization and data voltages to the pixel during the sensing period in response to a control signal output from the timing controller.

12 Claims, 9 Drawing Sheets

(52) U.S. Cl.
CPC ... *G09G 2310/061* (2013.01); *G09G 2310/08* (2013.01); *G09G 2360/147* (2013.01)

(56) References Cited

U.S. PATENT DOCUMENTS

| | | | | |
|---|---|---|---|---|
| 2017/0124941 | A1* | 5/2017 | Na | G09G 3/2092 |
| 2018/0322829 | A1 | 11/2018 | Xie | |
| 2021/0020083 | A1 | 1/2021 | Kim | |
| 2021/0287608 | A1 | 9/2021 | Min et al. | |
| 2021/0327341 | A1* | 10/2021 | Kim | H01L 27/124 |
| 2022/0375413 | A1 | 11/2022 | Pyun et al. | |

OTHER PUBLICATIONS

Final Office Action dated Feb. 6, 2023 in corresponding U.S. Appl. No. 17/566,489.
Office Action dated Aug. 24, 2022 in corresponding U.S. Appl. No. 17/566,489.

* cited by examiner

DISPLAY DEVICE AND METHOD OF DRIVING THE SAME

CROSS-REFERENCE TO RELATED APPLICATION

This U.S. non-provisional patent application is a continuation of U.S. patent application Ser. No. 17/566,489 filed Dec. 30, 2021, which claims priority under 35 U.S.C. § 119 to Korean Patent Application No. 10-2021-0065092 filed on May 20, 2021, the disclosure of which is incorporated by reference in its entirety herein.

1. Technical Field

The disclosure relates to a display device and a method of driving the same.

2. Discussion of Related Art

A flat-panel display (FPD) is an electronic display device used to enable people to see various content. An FPD is far lighter and thinner than traditional cathode ray type displays. Examples of the FPD include a display device such as a liquid crystal display device and an organic light emitting display device An organic light emitting display device has a fast response speed, emits light efficiently and may display images with a high luminance. However, a circuit element included in each pixel of the organic light emitting display device may degrade over time. In addition, an intrinsic characteristic of the circuit element may change when this degradation occurs.

SUMMARY

At least one embodiment of the disclosure provides a display device for determining an initialization voltage and a data voltage in consideration of a black data voltage for each sensing mode, and a method of driving the same.

According to an embodiment of the disclosure, a display device includes a sensor, a timing controller, and a data driver. The sensor is configured to sense characteristic values of a circuit element included in a pixel of the display device using an input initialization voltage and an input data voltage supplied to the pixel in a sensing period of one frame period. The timing controller is configured to calculate a compensation data voltage using the characteristic values, and calculate an adjusted initialization voltage and an adjusted data voltage by using the compensation data voltage. The data driver is configured to output the adjusted initialization voltage and the adjusted data voltage to the pixels during the sensing period in response to a control signal output from the timing controller.

In an embodiment, the timing controller further includes a first logic circuit configured to calculate the compensation data voltage by using a maximum threshold voltage compensation value of a driving transistor, a maximum mobility compensation value of the driving transistor, and a maximum characteristic value compensation value of a light emitting diode among the characteristic values sensed.

In an embodiment, the time controller supports a plurality of sensing modes including a threshold voltage sensing mode, a mobility sensing mode, and a characteristic value sensing mode of the light emitting diode, and a margin value of an initialization voltage for each sensing mode and a gate-source voltage setting value of a gate-source voltage of the driving transistor for each sensing mode are stored in the timing controller in advance.

In an embodiment, the timing controller further includes a second logic circuit configured to calculate the adjusted initialization voltage for each sensing mode by using the compensation data voltage and the margin value of the initialization voltage for each sensing mode, and a third logic circuit configured to calculate the adjusted data voltage for each sensing mode by using the compensation data voltage and the gate-source voltage setting value of the driving transistor for each sensing mode.

In an embodiment, the data driver further includes an initialization voltage generator and a data voltage generator, and when a threshold voltage sensing enable signal corresponding to a first control signal is applied, the initialization voltage generator outputs a first initialization voltage in the sensing period, when a mobility sensing enable signal corresponding to a second control signal is applied, the initialization voltage generator outputs a second initialization voltage in the sensing period, and when a characteristic value sensing enable signal corresponding to a third control signal is applied, the initialization voltage generator outputs a third initialization voltage in the sensing period.

In an embodiment, when the threshold voltage sensing enable signal is applied, the data voltage generator outputs a first data voltage in the sensing period, when the mobility sensing enable signal is applied, the data voltage generator outputs a second data voltage in the sensing period, and when the characteristic value sensing enable signal is applied, the data voltage generator outputs a third data voltage in the sensing period.

In an embodiment, the maximum threshold voltage compensation value corresponds to a largest value among difference values between a maximum value among threshold voltage values of the driving transistors and the threshold voltage values except for the maximum value, the maximum mobility compensation value corresponds to a largest value among difference values between a maximum value among mobility values of driving transistors of pixels of the display device and the mobility values except for the maximum value, and the maximum characteristic value compensation value corresponds to a largest value among difference values between a maximum value among characteristic values of light emitting diodes of the pixels and the characteristic values of the light emitting diodes except for the maximum value.

In an embodiment, when the gate-source voltage is constant, the third logic circuit calculates the adjusted data voltage for each sensing mode, which increases according to the compensation data voltage.

In an embodiment, when the gate-source voltage is not constant, the third logic circuit outputs a constant data voltage for each sensing mode regardless of the compensation data voltage.

In an embodiment, the adjusted initialization voltage is supplied to the pixel in a blank period of the one frame period.

In an embodiment, the adjusted initialization voltage is also supplied to the pixel during an active period of the one frame period.

According to an embodiment of the disclosure, a display device includes a sensor. The sensor is configured to sense characteristic values of a circuit element included in a pixel of the display device by using an initialization voltage and a data voltage supplied to the pixel in a sensing period of one frame period. After a first time is elapsed, the initialization voltage supplied to the pixel during the sensing period is set to a first voltage value, and after a second time different from the first time is elapsed, the initialization voltage supplied to the pixel is set to a second voltage value different from the first voltage value. After the first time is elapsed, the data voltage supplied to the pixel during the sensing period is set to a third voltage value, and after the second time is elapsed, the data voltage supplied to the pixel is set to a fourth voltage value different from the third voltage value. The first voltage value is lower than the second voltage value, and the third voltage value is higher than the fourth voltage value.

According to an embodiment of the disclosure, a method of driving a display device including a sensor, a timing controller, and a data driver is provided. The method includes sensing, by the sensor, characteristic values of a circuit element included in a pixel of the display device using an input initialization voltage and an input data voltage supplied to the pixel in a sensing period of one frame period. The method further includes calculating, by the timing controller, a compensation data voltage using the characteristic values, and calculating, by the timing controller, an adjusted initialization voltage and adjusted data voltage by using the compensation data voltage. The method further includes outputting, by the data driver, the calculated adjusted initialization voltage and the adjusted data voltage to the pixel during the sensing period in response to a control signal output from the timing controller.

In an embodiment, the calculating of the compensation data voltage includes calculating the compensation data voltage by using a maximum threshold voltage compensation value of a driving transistor, a maximum mobility compensation value of a driving transistor, and a maximum characteristic value compensation value of a light emitting diode among the characteristic values.

In an embodiment, the calculating of the adjusted initialization voltage includes calculating the adjusted initialization voltage from the compensation data voltage and a margin value associated with a mode of the timing controller. In an embodiment, the calculating of the adjusted data voltage includes calculating the adjusted data voltage from the compensation data voltage and a gate-source voltage setting value for a gate-source voltage of the driving transistor for the same mode.

In an embodiment, the method further includes: outputting a first initialization voltage generated from the compensation data voltage and the margin value associated with a threshold voltage of the driving transistor in the sensing period when the mode is a first mode; outputting a second initialization voltage generated from the compensation data voltage and the margin value associated with a mobility of the driving transistor in the sensing period when the mode is a second mode; and outputting a third initialization voltage generated from the compensation data voltage and the margin value associated with a light-emitting diode in the sensing period when the mode is a third mode.

In an embodiment, the method further includes: outputting a first data voltage generated from the compensation data voltage and the gate-source voltage setting value associated with a threshold voltage when the mode is a first mode; outputting a second data voltage generated from the compensation data voltage and the gate-source voltage setting value associated with a mobility in the sensing period when the mode is a second mode; and outputting a third data voltage generated from the compensation data voltage and the gate-source voltage setting value associated with a characteristic value of a light-emitting diode in the sensing period when the mode is a third mode.

In an embodiment, the adjusted data voltage increases according to the compensation data voltage, when a gate-source voltage of the driving transistor is constant.

In an embodiment, the adjusted initialization voltage is constant data regardless of the compensation data voltage, when a gate-source voltage of the driving transistor is not constant.

At least one embodiment of the display device and a method of driving the same according to the disclosure may reduce a sensing period by using the initialization voltage and the data voltage in consideration of a black data voltage for each sensing mode.

In addition, at least one embodiment of the display device and a method of driving the same according to the disclosure may prevent degradation of an element included in the pixel by using the initialization voltage and the data voltage in consideration of the black data voltage for each sensing mode.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
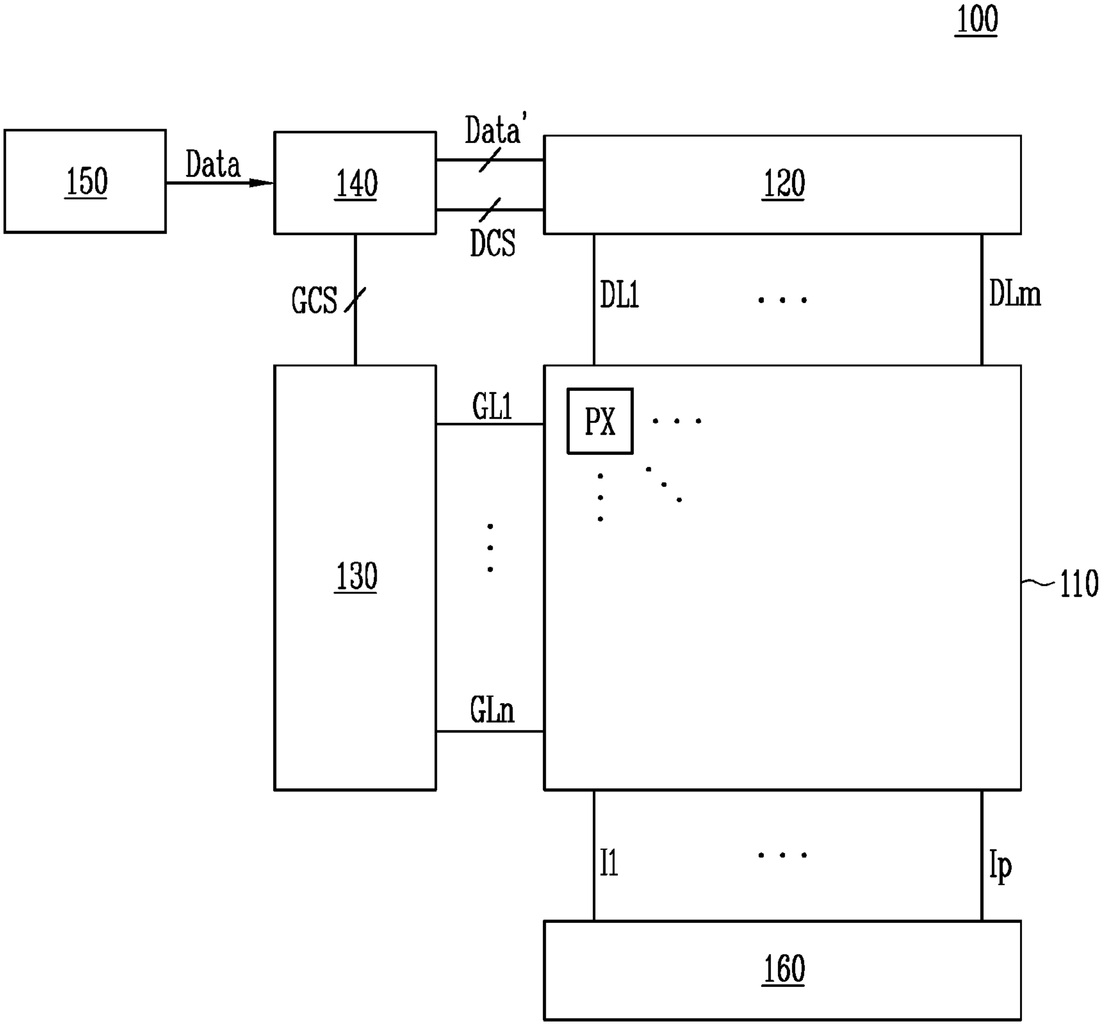
FIG. 1 is a diagram illustrating a display device according to an embodiment of the disclosure.

Hereinafter, embodiments of the disclosure are described in detail with reference to the accompanying drawings. Features of the embodiments, and a method for achieving them will be apparent with reference to the embodiments described later in detail together with the accompanying drawings. However, the disclosure is not limited to the embodiments disclosed below, but may be implemented in a variety of different forms. The same reference numerals refer to the same elements throughout the specification.

In the present specification, the singular form also includes the plural form unless the context clearly indicates otherwise.

Hereinafter, a display device according to an embodiment of the disclosure is described with reference to FIG. 1.

FIG. 1 is a diagram illustrating a display device according to an embodiment of the disclosure.

The display device 100 according to an embodiment of the disclosure includes a display panel 110, a data driver 120 (e.g., a driver circuit), a gate driver 130 (e.g., a scan driver or driver circuit), a timing controller 140 (e.g., a control circuit), a host system 150, and a sensing unit 160 (e.g., a sensor or sensor circuit).

A plurality of data lines DL1 to DLm (where m is a natural number greater than or equal to 2) and a plurality of sensing lines I1 to Ip (where p is a natural number greater than or equal to 2) are disposed in a first direction, and a plurality of gate lines GL1 to GLn (where n is a natural number greater than or equal to 2) are disposed in a second direction crossing the first direction, in the display panel 110. The gate lines may also be referred to as scan lines. In addition, a plurality of pixels PX may be disposed at points where the plurality of data lines DL1 to DLm, the plurality of sensing lines I1 to Ip, and the plurality of gate lines GL1 to GLn are intersected.

The data driver 120 may supply a data voltage to the pixel PX included in the display panel 110 through the plurality of data lines DL1 to DLm to drive the pixel PX included in the display panel 110.

Specifically, the data driver 120 may convert image data Data' received from the timing controller 140 into a data voltage Vdata (refer to FIG. 2) and supply the data voltage Vdata through the plurality of data lines DL1 to DLm.

In addition, the data driver 120 may include a plurality of source driver integrated circuits (ICs) or data driver ICs. The plurality of source driver ICs or the data driver ICs may be connected to the display panel 110, may be directly disposed on the display panel 110, or may be integrated and disposed on the display panel 110 in some cases.

The gate driver 130 may sequentially supply a scan signal to the pixel PX included in the display panel 110 through the plurality of gate lines GL1 to GLn to sequentially drive the pixel PX included in the display panel 110.

Specifically, the gate driver 130 may sequentially supply a scan signal (or a gate signal) of an on voltage or an off voltage to the plurality of gate lines GL1 to GLn under control of the timing controller 140. For example, the on voltage may cause a pixel to receive a data voltage and the off voltage may prevent a pixel from receiving the data voltage.

In addition, the gate driver 130 may be disposed on one side of the display panel 110 as shown in FIG. 1 according to a driving method, or may be disposed on both sides of the display panel 110 in some cases. For example, the gate driver 130 may be implemented by a first gate driving circuit disposed to the left of the display panel 110 and a second gate driving circuit disposed to the right of the display panel 110.

In addition, the gate driver 130 may include a plurality of gate driver ICs. The plurality of gate driver ICs may be connected to the display panel 110, may be directly disposed on the display panel 110, or may be integrated and disposed on the display panel 110 in some cases. In an embodiment, the plurality of gate driver ICs include a shift register.

The timing controller 140 may supply a data control signal DCS to the data driver 120 and a gate control signal GCS to the gate driver 130 to control an operation of the data driver 120 and the gate driver 130.

Specifically, the timing controller 140 may receive a timing signal such as a vertical synchronization signal Vsync, a horizontal synchronization signal Hsync, an input data enable (DE) signal, and a clock signal, generate the various control signals DCS and GCS, and output the data control signal DCS to the data driver 120 and output the gate control signal GCS to the gate driver 130.

In an embodiment, the timing controller 140 outputs the gate control signal GCS including a gate start pulse, a gate shift clock signal, and a gate output enable signal to the gate driver 130 to control the gate driver 130.

The gate start pulse controls an operation start timing of the gate driver ICs configuring the gate driver 130. The gate shift clock signal is a clock signal commonly input to the gate driver Ics and controls a shift timing of the scan signal. The gate output enable signal designates timing information of the gate driver Ics.

In addition, the timing controller 140 may start scanning according to a timing implemented in each frame (or frame period), convert image data Data input from the host system 150 so that the image data Data has a suitable data signal format used by the data driver 120, and output the converted image data Data' to the data driver 120.

In an embodiment, the timing controller 140 output the data control signal DCS including a source start pulse, a source sampling clock signal, and a source output enable (SOE) signal to the data driver 120 to control the data driver 120.

The source start pulse controls a data sampling start timing of the source driver ICs configuring the data driver 120. The source sampling clock signal corresponds to a clock signal that controls a data sampling timing in each of the source driver ICs. The source output enable signal controls an output timing of the data driver 120.

The host system 150 may transmit the timing signals including the vertical synchronization signal Vsync, the horizontal synchronization signal Hsync, the input data enable signal, and the clock signal CLK together with the input image data Data to the timing controller 140.

The sensing unit 160 may include sensing channels connected to the sensing lines I1 to Ip (where p is a natural number greater than or equal to 2). In an embodiment, the sensing lines I1 to Ip and the sensing channels correspond one-to-one. The sensing unit 160 may sense characteristic values of an element included in each pixel PX in a sensing period of one frame P (or frame period) (refer to FIG. 9). In an embodiment, the sensing lines I1 to Ip and the sensing channels do not correspond one-to-one. For example, one sensing channel may include more than one sensing line.

Hereinafter, a pixel according to an embodiment of the disclosure is described with reference to FIG. 2.

Figure 2:
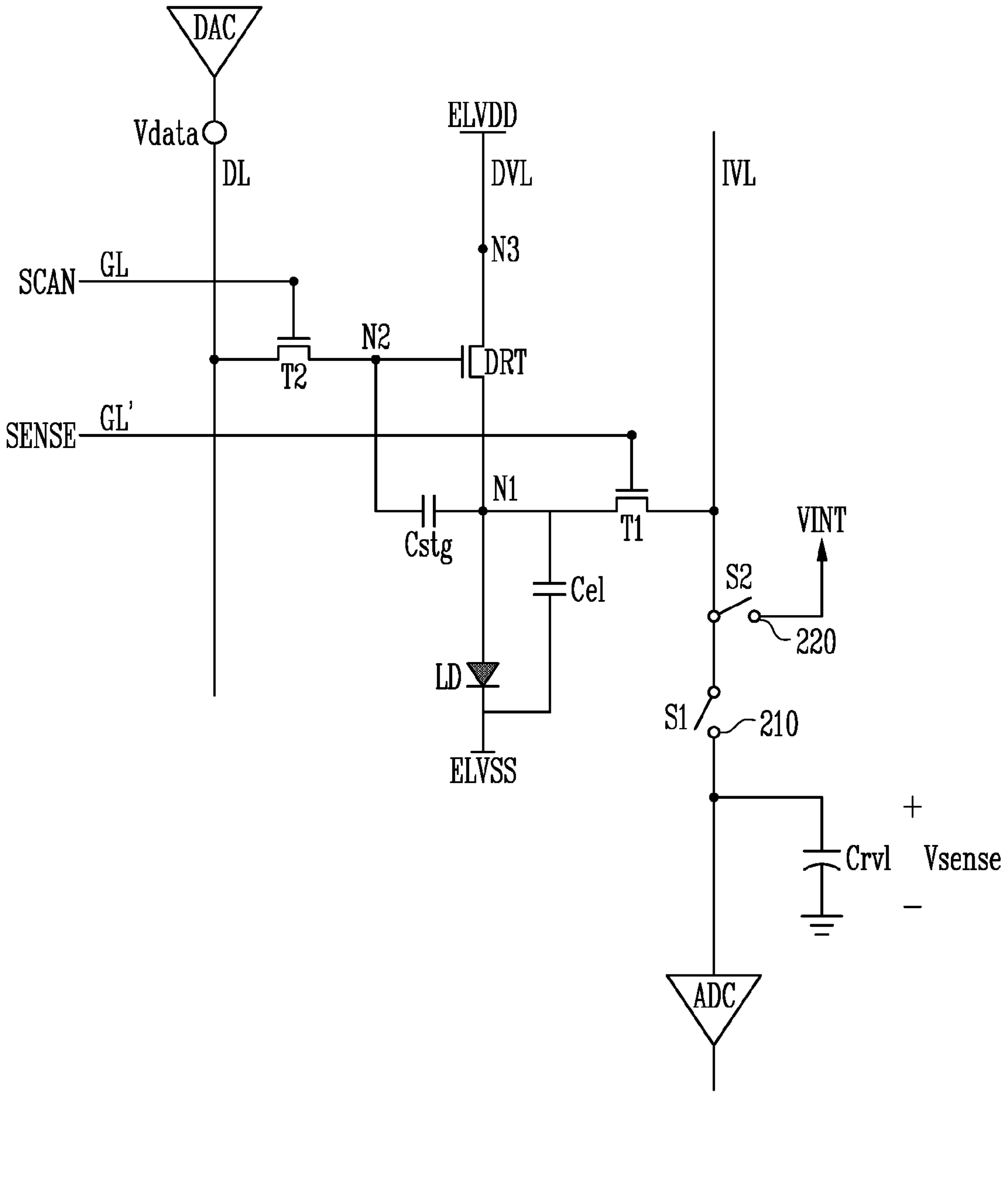
FIG. 2 is a diagram illustrating a pixel of the display device according to an embodiment of the disclosure.

FIG. 2 is a diagram illustrating a pixel according to an embodiment of the disclosure.

Each pixel PX disposed on the display panel 110 according to an embodiment include a light emitting diode LD, a driving transistor DRT, a first transistor T1, a second transistor T2, and a storage capacitor Cstg.

The driving transistor DRT according to an embodiment of the disclosure drives the light emitting diode LD by supplying a driving current to the light emitting diode LD.

A first non-gate electrode of the driving transistor DRT is electrically connected to a first electrode of the light emitting diode LD through a first node N1, a gate electrode of the driving transistor DRT is connected to a second node N2, and a second non-gate electrode of the driving transistor DRT is electrically connected to a driving voltage line DVL through a third node N3.

The first transistor T1 is controlled by a sense signal SENSE, which is a type of a scan signal applied to a gate node of the first transistor T1 through a corresponding gate line GL', and is electrically coupled between the first node N1 of the driving transistor DRT and an initialization voltage line IVL.

In addition, the first transistor T1 may be turned on by the sense signal SENSE applied to the gate node, to apply an initialization voltage VINT supplied through the initialization voltage line IVL to the first node N1 of the driving transistor DRT.

The second transistor T2 is controlled by a scan signal SCAN applied to a gate node of the second transistor T2 through a corresponding gate line GL, and is electrically connected between a second node N2 of the driving transistor DRT and a data line DL.

For example, the light emitting diode LD may be implemented by an organic light emitting diode, or an inorganic light emitting diode such as a micro light emitting diode or a quantum dot light emitting diode. In addition, the light emitting diode LD may be a light emitting element in which an organic material and an inorganic material are combined. Further, each of the pixels PX may include a single light emitting element. Alternatively, in another embodiment, each of the pixels PX may include a plurality of light emitting elements, and the plurality of light emitting elements may be connected in series, parallel, or in series and parallel.

When digital data is converted into the data voltage Vdata by a digital-to-analog converter DAC included in the data driver 120 and the data voltage Vdata is output to the data line DL, the output data voltage Vdata is applied to the second transistor T2 through the data line DL.

When the second transistor T2 is turned on by the scan signal SCAN, the data voltage Vdata supplied through the data line DL is applied to the second node N2 corresponding to the gate node of the driving transistor DRT. For example, the second transistor T2 may be turned on by an on voltage of the scan signal SCAN.

The storage capacitor Cstg may be electrically connected to the driving transistor DRT through the first node N1 and the second node N2, and may maintain a constant voltage during one frame (or one frame period).

The display device 100 according to an embodiment may further include an analog-to-digital converter ADC that is electrically connected to the initialization voltage line IVL through a switch S1 (e.g., a switching circuit) to sense a voltage of the initialization voltage line IVL. One or more analog-to-digital converters ADC may be included in the sensing unit 160. In an embodiment, the switch S1 is implemented using a transistor that is opened and closed according to a control signal applied to gate of the transistor.

According to an operation of the switch S1, the initialization voltage line IVL may be connected to or disconnected from a node 210 connected to the analog-to-digital converter ADC. In addition, according to an operation of a switch S2, the initialization voltage line IVL may be connected to or disconnected from a node 220 to which the initialization voltage VINT is supplied.

Meanwhile, the driving transistor DRT in each pixel PX has an intrinsic characteristic value such as a threshold voltage Vth and mobility u. As a driving time of the driving transistor DRT is increased, degradation occurs, and thus the intrinsic characteristic value is changed. The mobility u may be electron mobility, hole mobility or carrier mobility, of the driving transistor DRT.

In addition, a degradation degree of the driving transistors DRT in each pixel PX may be different from each other. Accordingly, an intrinsic characteristic value deviation (a threshold voltage deviation, and a mobility deviation) between the driving transistors DRT in each pixel PX may occur. The intrinsic characteristic value deviation may cause a luminance deviation or difference between the pixels PX. Therefore, a luminance uniformity of the display panel 110 may be reduced and image quality may be reduced. Accordingly, the display device 100 according to an embodiment of the disclosure may include the analog-to-digital converter ADC and the switches S1 and S2 in each pixel PX to compensate for the intrinsic characteristic value deviation of the driving transistor DRT. A process of sensing deviation (threshold voltage, and mobility) information of the driving transistor DRT by the sensing unit 160 is described later with reference to FIG. 3.

Additionally, when the driving transistor DRT is in an off state and the first transistor T1 is in an on state, a reference voltage may be applied to the first node N1 through the initialization voltage line IVL. In this embodiment, a current may flow through the initialization voltage line IVL, the first transistor T1, and the light emitting diode LD, and the current may be converted into data by the analog-to-digital converter ADC and then supplied to the timing controller 140. The data may correspond to a characteristic of the light emitting diode LD included in each pixel PX or the characteristic may be inferred from the data.

The timing controller 140 may measure a characteristic value el of the light emitting diode LD based on the received data, and calculate a characteristic value deviation Δel of the light emitting diodes LD included in each pixel PX using the characteristic value el. In an embodiment, the timing controller 140 designates the largest value among difference values between a maximum value of the measured characteristic value el of the light emitting diodes LD and remaining characteristic values el except for the maximum value of the characteristic value el as a characteristic value compensation value ΔV_el_Comp (refer to FIG. 4).

Hereinafter, a sensing operation of sensing an intrinsic characteristic value of a driving transistor according to an embodiment of the disclosure is described with reference to FIG. 3.

Figure 3:
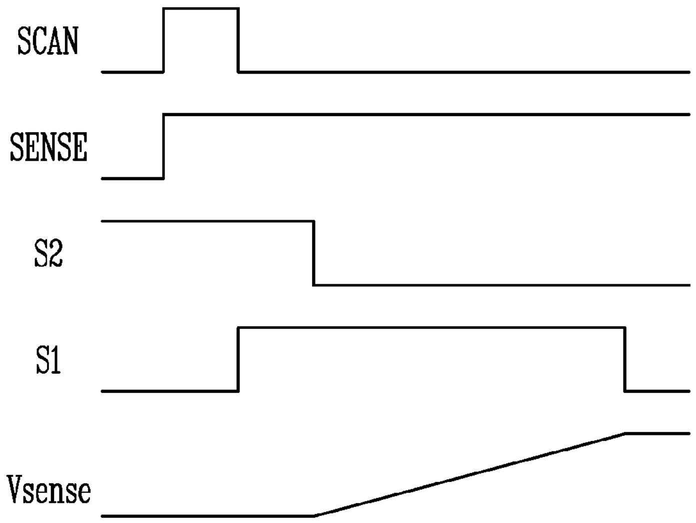
FIG. 3 is a diagram illustrating a sensing operation of sensing an intrinsic characteristic value of a driving transistor of the pixel according to an embodiment of the disclosure.

FIG. 3 is a diagram illustrating a sensing operation of sensing an intrinsic characteristic value of a driving transistor according to an embodiment of the disclosure.

The second transistor T2 is in an on state by the scan signal SCAN applied to the gate node, and the first transistor T1 is in an on state by the sense signal SENSE applied to the gate node. In addition, the switch S2 is in a state in which the initialization voltage line IVL is connected to the node 220. The switch S1 is in an off state.

At this time, the initialization voltage VINT and the data voltage Vdata are applied to the first node N1 and the second node N2 of the driving transistor DRT, respectively.

Specifically, the data voltage Vdata output from the data driver 120 to the data line DL is applied to the second node N2 of the driving transistor DRT through the second transistor T2. In addition, through the node 220, the initialization voltage VINT is applied to the first node N1 of the driving transistor DRT through the first transistor T1. At this time, the storage capacitor Cstg stores a voltage corresponding to a difference between the data voltage Vdata and the initialization voltage VINT.

Thereafter, when the second transistor T2 is in an off state and the switch S1 is in an on state, the node 210 connected to the analog-to-digital converter ADC is connected to the initialization voltage line IVL. When the second transistor T2 is turned off, the second node N2 is set to a floating state, and thus the storage capacitor Cstg maintains a previously stored voltage.

In addition, when the switch S2 is in an off state, the driving transistor DRT supplies a current corresponding to the voltage stored in the storage capacitor Cstg to the initialization voltage line IVL. At this time, a capacitor Crvl is charged with a voltage Vsense by the current supplied to the initialization voltage line IVL. At this time, the voltage Vsense charged in the capacitor Crvl increases with a predetermined slope in response to the current from the driving transistor DRT.

The analog-to-digital converter ADC may sense the voltage Vsense that is a voltage across the capacitor Crvl through the initialization voltage line IVL, and transmit sensing data obtained by converting the sensed voltage into a digital value to the timing controller 140.

The timing controller 140 may measure the threshold voltage Vth of the driving transistors DRTs in each pixel PX based on the received sensing data, and may calculate a threshold voltage deviation ΔVth between the driving transistors DRT included in each pixel PX using the threshold voltage Vth. At this time, the timing controller 140 may designate the largest value among difference values between a maximum value among the measured threshold voltages Vth of the driving transistors DRT and the remaining threshold voltages Vth except for the maximum value among the threshold voltages Vth as a maximum threshold voltage compensation value ΔV_vth_Comp (refer to FIG. 4).

The timing controller 140 may measure a mobility u of the driving transistor DRT in each pixel PX based on the received sensing data, and may calculate a mobility deviation Δu between the driving transistors DRT included in each pixel PX using the mobility u. At this time, the timing controller 140 may designate the largest value among difference values between a maximum value among the measured mobility u of the driving transistors DRT and the remaining mobility u except for the maximum value among the mobility u as a maximum mobility compensation value ΔV_u_Comp (refer to FIG. 4).

In order to compensate for the calculated threshold voltage deviation ΔVth, mobility deviation Δu, and characteristic value deviation Δel, the timing controller 140 may change data to be applied to each pixel PX and transmit the changed data to the data driver 120 based on the maximum threshold voltage compensation value ΔV_vth_Comp (refer to FIG. 4), the maximum mobility compensation value ΔV_u_Comp (refer to FIG. 4), and the maximum characteristic value compensation value ΔV_el_Comp (refer to FIG. 4) for each pixel PX.

Hereinafter, a method of determining an initialization voltage and a data voltage for each characteristic value according to an embodiment of the disclosure is described with reference to FIG. 4.

Figure 4:
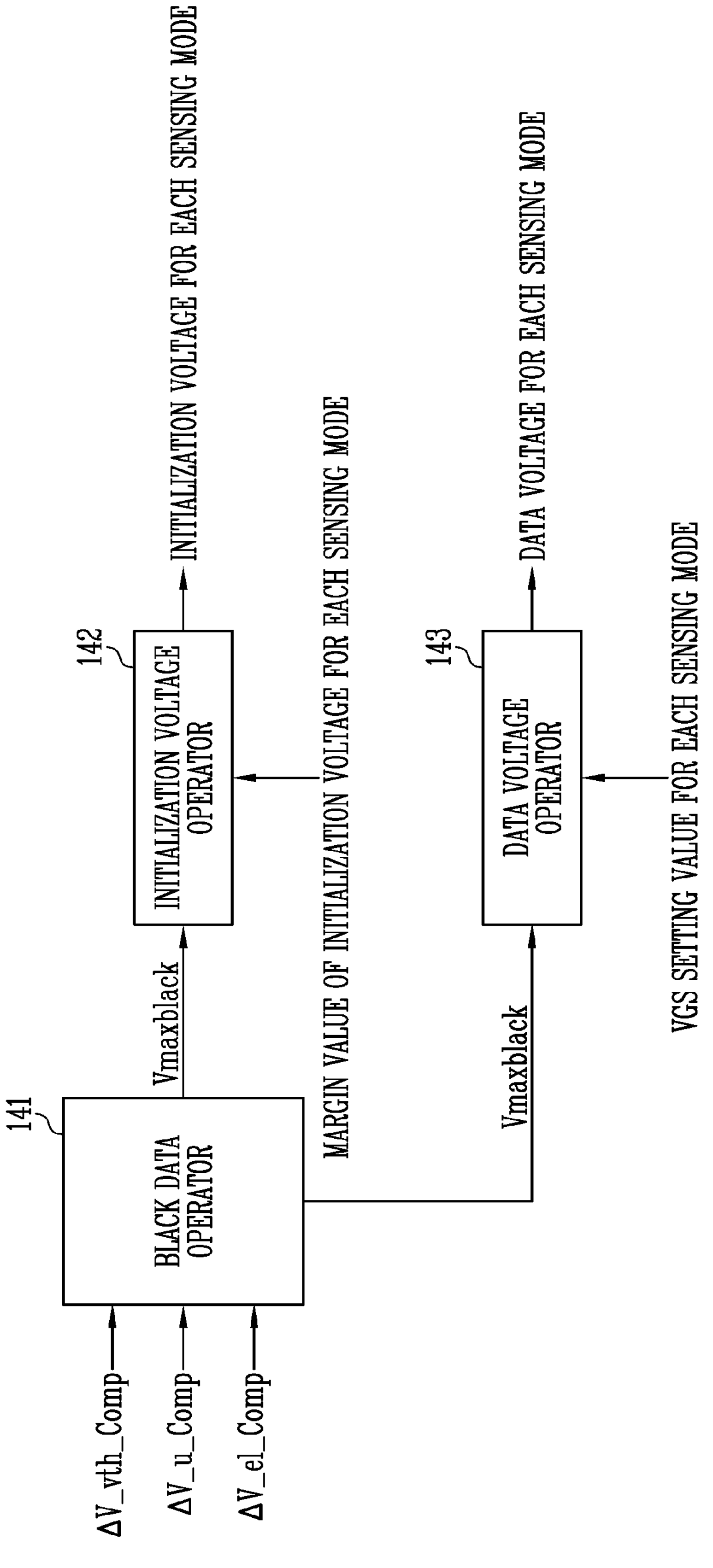
FIG. 4 is a diagram illustrating a method of determining an initialization voltage and a data voltage for each characteristic value according to an embodiment of the disclosure.

FIG. 4 is a diagram illustrating a method of determining an initialization voltage and a data voltage for each characteristic value according to an embodiment of the disclosure.

The timing controller 140 according to an embodiment of the disclosure includes a black data operator 141 (e.g., a first logic circuit), an initialization voltage operator 142 (e.g., a second logic circuit), and a data voltage operator 143.

The black data operator 141 may receive the maximum threshold voltage compensation value ΔV_vth_Comp, the maximum mobility compensation value ΔV_u_Comp, and the maximum characteristic value compensation value ΔV_el_Comp of the light emitting diode LD. In an embodiment, the timing controller 140 receives ΔV_vth_Comp, ΔV_u_Comp, and ΔV_el_Comp from the sensing unit 160 and the timing controller 140 provides the same to the black data operator 141.

In an embodiment, the maximum threshold voltage compensation value ΔV_vth_Comp corresponds to a maximum value among deviations of a maximum value among the threshold voltages Vth between the driving transistors DRT in each pixel PX received by the timing controller 140 and the remaining threshold voltages Vth. In an embodiment, the maximum mobility compensation value ΔV_u_Comp corresponds to a maximum value among deviations of a maximum value among the mobility u between the driving transistors DRT in each pixel PX received by the timing controller 140 and the remaining mobility u. In an embodiment, the maximum characteristic value compensation value ΔV_el_Comp of the light emitting diode LD corresponds to a maximum value among deviations of a maximum value among the characteristic values el of the light emitting diode LD in each pixel PX received by the timing controller 140 and the remaining characteristic values el.

The black data operator 141 may calculate a compensation data voltage by using the received maximum threshold voltage compensation value ΔV_vth_Comp, maximum mobility compensation value ΔV_u_Comp, and maximum characteristic value compensation value ΔV_el_Comp.

Hereinafter, the compensation data voltage is referred to as a maximum black data voltage Vmaxblack.

In an embodiment, the maximum black data voltage Vmaxblack is calculated by summing together the maximum threshold voltage compensation value ΔV_vth_Comp, the maximum mobility compensation value ΔV_u_Comp, and the maximum characteristic value compensation value ΔV_el_Comp, and may be expressed according to Equation 1.

$$V\text{maxblack}=\Delta V\_vth\_\text{Comp}+\Delta V\_u\_\text{Comp}+\Delta V\_el\_\text{Comp} \quad \text{[Equation 1]}$$

Specifically, the maximum black data voltage Vmaxblack may be set by reflecting the threshold voltage Vth of the pixels PX, the mobility u, and the deterioration information of the light emitting diode LD. Accordingly, even though the degradation of the pixels PX progresses, the pixels PX may be stably driven. In an embodiment, when the maximum black data voltage Vmaxblack is reset, a data voltage corresponding to predetermined grayscales may also be reset.

Meanwhile, when the initialization voltage VINT and the data voltage Vdata supplied during sensing are constantly maintained regardless of a change of the maximum black data voltage Vmaxblack, a sensing time may be increased. Accordingly, in the disclosure, the initialization voltage VINIT and the data voltage Vdata supplied during sensing may be reset in consideration of the maximum black data voltage Vmaxblack.

The initialization voltage operator may 142 receive the maximum black data voltage Vmaxblack from the black data operator 141, and calculate the initialization voltage VINT for each sensing mode based on a limit (e.g., a margin) value of the initialization voltage VINT for each sensing mode. The margin value may be different for each sensing mode.

In an embodiment, the sensing mode includes a mode for measuring the threshold voltage Vth of the driving transistor DRT in each pixel PX, measuring the mobility u of the driving transistor DRT, and measuring the characteristic value el of the light emitting diode LD.

That is, the initialization voltage operator 142 may calculate the initialization voltage VINT applied to the driving transistor DRT when measuring the threshold voltage Vth and the mobility u of the driving transistor DRT. In addition, the initialization voltage operator 142 may calculate the applied initialization voltage (or a reference voltage) when measuring the characteristic value el of the light emitting diode LD.

When the threshold voltage Vth of the driving transistor DRT is sensed, the initialization voltage VINT applied to the driving transistor DRT calculated by the initialization voltage operator 142 may be expressed by Equation 2 below.

$$VINT = V\text{maxblack} + \text{margin}_T \quad \text{[Equation 2]},$$

where margin $\text{margin}_T$ is a margin value when measuring a threshold voltage Vth.

In addition, when the mobility u of the driving transistor DRT is measured, the initialization voltage VINT applied to the driving transistor DRT calculated by the initialization voltage operator 142 may be expressed by Equation 3 below.

$$VINT = V\text{maxblack} + \text{margin}_U \quad \text{[Equation 3]},$$

where $\text{margin}_U$ is a margin value when measuring mobility u.

In addition, when the characteristic value el of the light emitting diode LD is measured, the initialization voltage VINT (or the reference voltage) applied to the driving transistor DRT calculated by the initialization voltage operator 142 may be expressed by Equation 4 below.

$$VINT = V\text{maxblack} + \text{margin}_{EL} \quad \text{[Equation 4]},$$

where $\text{margin}_{EL}$ is a margin value when measuring a characteristic value el of the light emitting diode LD.

The margin value $\text{margin}_T$ when measuring the threshold voltage Vth, the margin value $\text{margin}_U$ when measuring the mobility u, and the margin value $\text{margin}_{EL}$ when measuring the characteristic value el of light emitting diode LD may be preset in consideration of a characteristic of the display panel 110.

The data voltage operator 143 receives the maximum black data voltage Vmaxblack from the black data operator 141, and calculates the data voltage Vdata for each sensing mode based on a pre-stored gate-source voltage VGS setting value of the driving transistor DRT for each sensing mode.

That is, when measuring the threshold voltage Vth and the mobility u of the driving transistor DRT, the data voltage operator 143 may calculate the data voltage Vdata applied to the driving transistor DRT.

When measuring the threshold voltage Vth of the driving transistor DRT, the data voltage Vdata applied to the driving transistor DRT calculated by the data voltage operator 143 may be expressed by Equation 5 below.

$$V\text{data} = V\text{maxblack} + VGS_T \quad \text{[Equation 5]},$$

where $VGS_T$ is the gate-source voltage setting value when measuring the threshold voltage Vth.

In addition, when the mobility u of the driving transistor DRT is measured, the data voltage Vdata applied to the driving transistor DRT calculated by the data voltage operator 143 may be expressed by Equation 6 below.

$$V\text{data} = V\text{maxblack} + VGS_U \quad \text{[Equation 6]},$$

where $VGS_U$ is the gate-source voltage setting value when measuring mobility u.

In addition, when the characteristic value el of the light emitting diode LD is measured, the data voltage Vdata applied to the driving transistor DRT calculated by the data voltage operator 143 may be expressed by Equation 7 below.

$$V\text{data} = \text{maximum black data voltage} + VGS_{EL} \quad \text{[Equation 7]},$$

where $VGS_{EL}$ is the gate-source voltage setting value when measuring characteristic value el.

According to an embodiment of the disclosure, the maximum black data voltage Vmaxblack may be calculated using the maximum threshold voltage compensation value ΔV_vth_Comp, the maximum mobility compensation value ΔV_u_Comp, and the maximum characteristic value compensation value ΔV_el_Comp between the driving transistor DRT in each pixel PX, and an optimal initialization voltage VINT and data voltage Vdata for each sensing mode may be calculated based on the margin value of the initialization voltage VINT for each sensing mode (e.g., $\text{margin}_T$, $\text{margin}_U$, $\text{margin}_{EL}$) and the gate-source voltage VGS setting value of the driving transistor DRT for each sensing mode (e.g., $VGS_T$, $VGS_U$, $VGS_{EL}$).

Additionally, when the gate-source voltage VGS needs to be maintained to be constant in the sensing mode, the data voltage operator 143 may calculate different data voltages Vdata for each sensing mode as described above. However, when the gate-source voltage VGS does not need to be maintained to be constant in the sensing mode, the data voltage operator 143 may output a constant data voltage Vdata value regardless of the sensing mode.

Hereinafter, a process of outputting an initialization voltage and a data voltage according to an embodiment of the disclosure is described with reference to FIG. 5.

Figure 5:
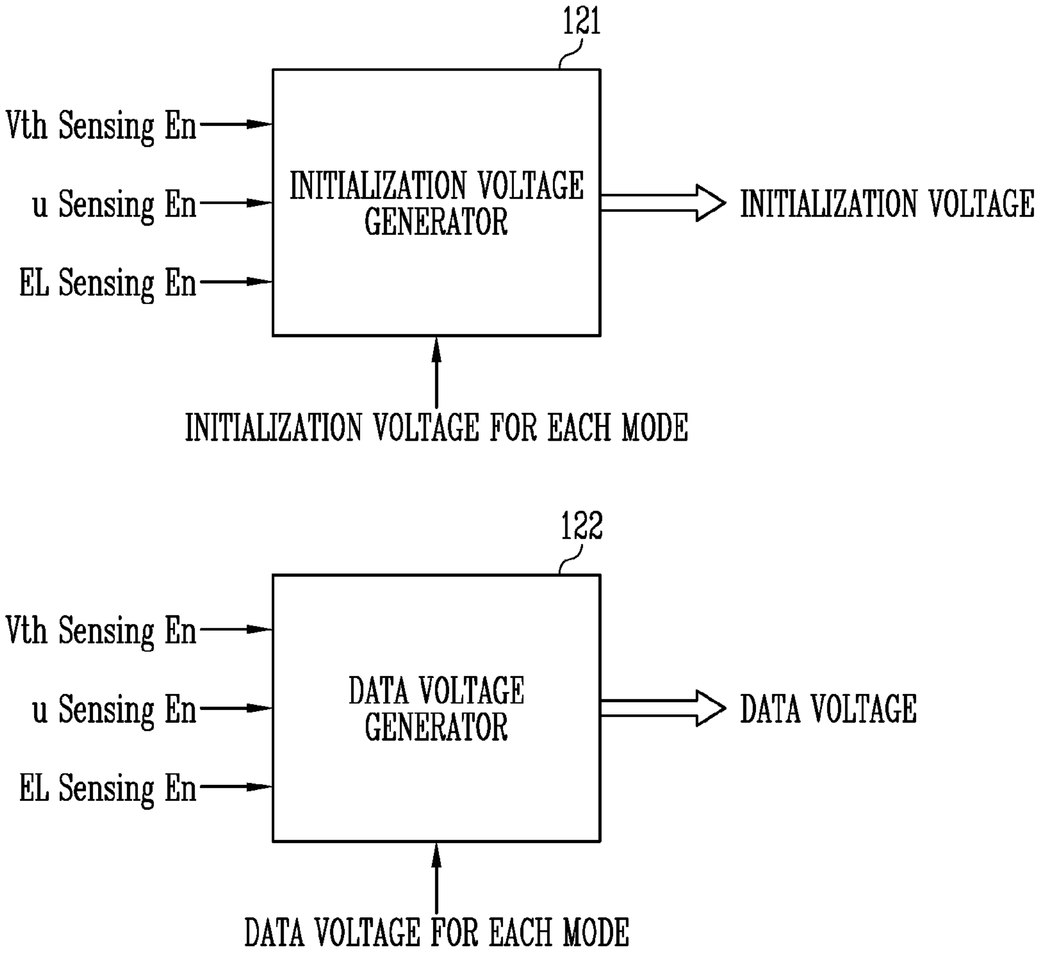
FIG. 5 is a diagram illustrating a process of outputting an initialization voltage and a data voltage according to an embodiment of the disclosure.

FIG. 5 is a diagram illustrating a process of outputting an initialization voltage and a data voltage according to an embodiment of the disclosure.

The initialization voltage generator 121 receives the optimal initialization voltages VINT for each sensing mode calculated by the initialization voltage operator 142. In an embodiment, the initialization voltage generator 121 is located within the data driver 120.

Specifically, the initialization voltage generator 121 receives the initialization voltage VINT calculated by the initialization voltage operator 142 when the threshold voltage Vth of the driving transistor DRT is sensed, when the mobility u of the driving transistor DRT is sensed, and the characteristic value el of the light emitting diode LD is measured.

When the initialization voltage generator 121 receives a threshold voltage sensing enable signal Vth Sensing En corresponding to a first control signal from the timing controller 140, the initialization voltage generator 121 may output a first initialization voltage that is the initialization voltage VINT calculated when the threshold voltage Vth of the driving transistor DRT received from the initialization voltage operator 142 is sensed.

In addition, when the initialization voltage generator 121 receives a mobility sensing enable signal u Sensing En corresponding to a second control signal from the timing controller 140, the initialization voltage generator 121 may output a second initialization voltage that is the initialization voltage VINT calculated when the mobility u of the driving transistor DRT received from the initialization voltage operator 142 is sensed.

In addition, when the initialization voltage generator 121 receives a characteristic value sensing enable signal el Sensing En of the light emitting diode LD corresponding to a third control signal from the timing controller 140, the initialization voltage generator 121 may output a third initialization voltage that is the initialization voltage VINT calculated when the characteristic value el of the light emitting diode LD received from the initialization voltage operator 142 is measured.

The data voltage generator 122 receives the optimal data voltages Vdata for each sensing mode calculated by the data voltage operator 143. In an embodiment, the data voltage generator 122 is located within the data driver 120.

Specifically, the data voltage generator 122 receives the data voltage Vdata calculated when the data voltage operator 143 senses the threshold voltage Vth of the driving transistor DRT, senses the mobility u of the driving transistor DRT, and measures the characteristic value el of the light emitting diode LD.

When the data voltage generator 122 receives the threshold voltage sensing enable signal Vth Sensing En corresponding to the first control signal from the timing controller 140, the data voltage generator 122 outputs a first data voltage that is the data voltage Vdata calculated when the threshold voltage Vth of the driving transistor DRT received from the data voltage operator 143 is sensed.

In addition, when the data voltage generator 122 receives the mobility sensing enable signal u Sensing En corresponding to the second control signal from the timing controller 140, the data voltage generator 122 outputs a second data voltage that is the data voltage Vdata calculated when the mobility u of the driving transistor DRT received from the data voltage operator 143 is sensed.

In addition, when the data voltage generator 122 receives the characteristic value sensing enable signal el Sensing En of the light emitting diode LD corresponding to the third control signal from the timing controller 140, the data voltage generator 122 outputs a third data voltage that is the data voltage Vdata calculated when the characteristic value el of the light emitting diode LD received from the data voltage operator 143 is measured.

Hereinafter, a change of an initialization voltage and a data voltage according to a maximum black data voltage when a gate-source voltage is constant according to an embodiment of the disclosure is described with reference to FIGS. 6A to 6C.

Figure 6A:
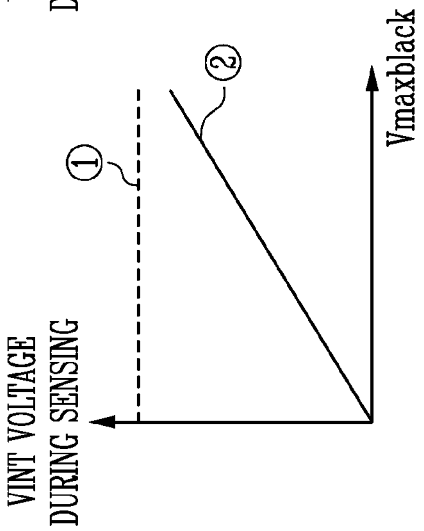
FIGS. 6A to 6C are diagrams illustrating a change of an initialization voltage and a data voltage according to a maximum black data voltage when a gate-source voltage is constant according to an embodiment of the disclosure.
Figure 6B:
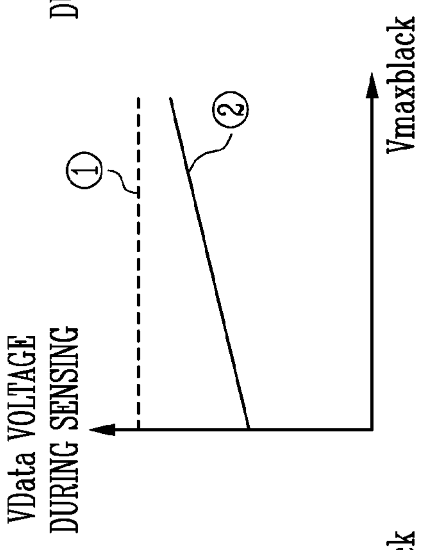
Figure 6C:
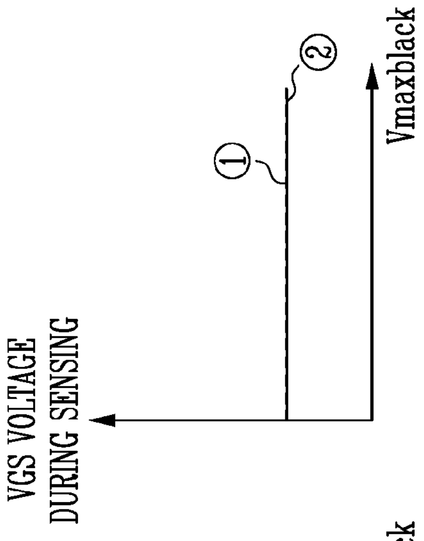

FIGS. 6A to 6C are diagrams illustrating a change of an initialization voltage and a data voltage according to a maximum black data voltage when a gate-source voltage is constant according to an embodiment of the disclosure.

FIG. 6A is a diagram illustrating a change of the initialization voltage VINT according to the maximum black data voltage Vmaxblack according to an embodiment of the disclosure. FIG. 6B is a diagram illustrating a change of the data voltage Vdata according to the maximum black data voltage Vmaxblack according to an embodiment of the disclosure. FIG. 6C is a diagram illustrating a change of the gate-source voltage Vgs according to the maximum black data voltage Vmaxblack according to an embodiment of the disclosure.

① of FIG. 6A shows a comparative example, and corresponds to a graph of the initialization voltage VINT applied to the driving transistor DRT according to the maximum black data voltage Vmaxblack without considering the optimal initialization voltage VINT for each sensing mode of FIG. 5. ② corresponds to a change graph of the initialization voltage VINT of the driving transistor DRT according to the maximum black data voltage Vmaxblack considering the optimal initialization voltage VINT for each sensing mode of FIG. 5.

Referring to ① of FIG. 6A, the initialization voltage VINT applied to the driving transistor DRT is constant regardless of the maximum black data voltage. Referring to ② of FIG. 6A, as the maximum black data voltage increases, the initialization voltage VINT applied to the driving transistor DRT increases, but is smaller than the initialization voltage VINT of ①.

① of FIG. 6B shows a comparative example, and corresponds to a graph of the data voltage Vdata applied to the driving transistor DRT according to the maximum black data voltage Vmaxblack without considering the optimal data voltage Vdata for each sensing mode of FIG. 5. ② corresponds to a change graph of the data voltage Vdata of the driving transistor DRT according to the maximum black data voltage Vmaxblack considering the optimal data voltage Vdata for each sensing mode of FIG. 5.

① of FIG. 6B shows a comparative example, and the data voltage Vdata applied to the driving transistor DRT is constant regardless of the maximum black data voltage. Referring to ② of FIG. 6B, as the maximum black data voltage increases, the data voltage Vdata applied to the driving transistor DRT increases, but is smaller than the data voltage Vdata of ①.

Referring to FIGS. 2 and 6A to 6C, the initialization voltage VINT and the data voltage Vdata of the driving transistor DRT of a case where the optimal initialization voltage VINT and data voltage Vdata for each sensing mode are considered may be decreased compared to a case where the optimal initialization voltage VINT and data voltage Vdata for each sensing mode are not considered. In response to this, the gate-source voltage VGS of the driving transistor DRT may be constant regardless of the maximum black data voltage.

That is, when a constant gate-source voltage VGS of the driving transistor DRT is needed, the initialization voltage VINT may be decreased by varying the data voltage Vdata.

In addition, according to an embodiment of the disclosure, a voltage level of the initialization voltage VINT of the case where the optimal initialization voltage VINT and data voltage Vdata for each sensing mode are considered may be decreased compared to the case where the optimal initialization voltage VINT and data voltage Vdata for each sensing mode are not considered. Therefore, a voltage difference between the first node N1 of a parasitic capacitor Cel and the node 220 may be large.

That is, since the voltage level of the initialization voltage VINT is decreased, an amount of current flowing through the first node N1 may be increased when the initialization voltage VINT is applied to the node 220.

Therefore, as the initialization voltage VINT decreases, an amount of current flowing from driving power ELVDD to the first node N1 may increase, and thus the parasitic capacitor Cel may be charged to a desired voltage within a short time. Accordingly, the sensing period may be shortened.

Hereinafter, changes of an initialization voltage and a data voltage according to a maximum black data voltage when a gate-source voltage is decreased according to an embodiment of the disclosure is described with reference to FIGS. 7A to 7C.

Figure 7A:
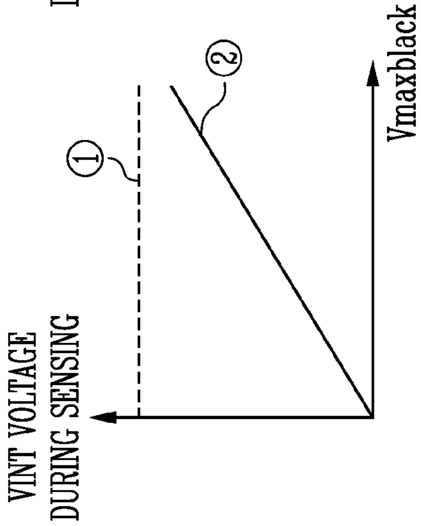
FIGS. 7A to 7C are diagrams illustrating a change of an initialization voltage and a data voltage according to a maximum black data voltage when a gate-source voltage is decreased according to an embodiment of the disclosure.
Figure 7B:
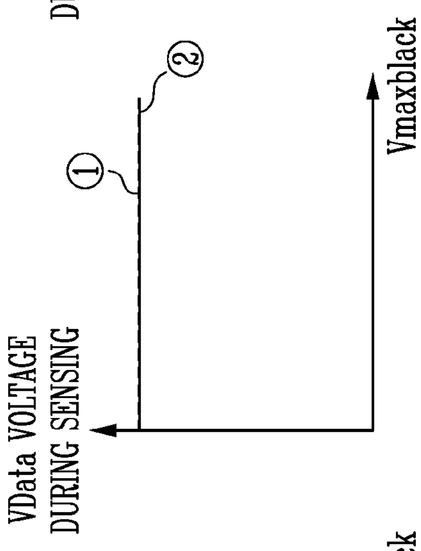
Figure 7C:
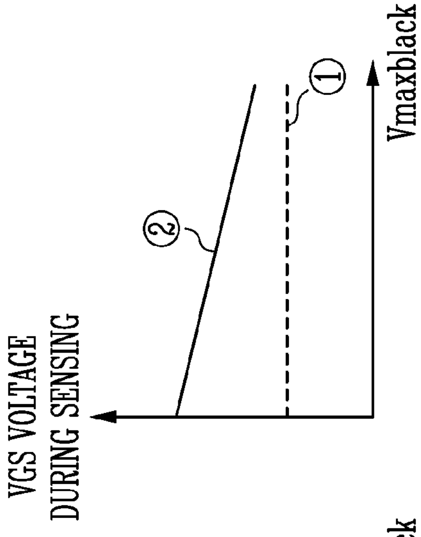

FIGS. 7A to 7C are diagrams illustrating a change of an initialization voltage and a data voltage according to a maximum black data voltage when a gate-source voltage is decreased according to an embodiment of the disclosure.

FIG. 7A is a diagram illustrating a change of the initialization voltage VINT according to the maximum black data voltage Vmaxblack according to an embodiment of the disclosure. FIG. 7B is a diagram illustrating a change of the data voltage Vdata according to the maximum black data voltage Vmaxblack according to an embodiment of the disclosure. FIG. 7C is a diagram illustrating a change of the gate-source voltage VGS according to the maximum black data voltage Vmaxblack according to an embodiment of the disclosure.

① of FIG. 7(*a*) shows a comparative example, and corresponds to a graph of the initialization voltage VINT applied to the driving transistor DRT according to the maximum black data voltage Vmaxblack without considering the optimal initialization voltage VINT for each sensing mode of FIG. 5. ② corresponds to a change graph of the initialization voltage VINT of the driving transistor DRT according to the maximum black data voltage Vmaxblack considering the optimal initialization voltage VINT for each sensing mode of FIG. 5.

Referring to ① of FIG. 7A, the initialization voltage VINT applied to the driving transistor DRT is constant regardless of the maximum black data voltage Vmaxblack. Referring to ② of FIG. 7A, as the maximum black data voltage Vmaxblack increases, the initialization voltage VINT applied to the driving transistor DRT increases, but is smaller than the initialization voltage VINT of ①.

① of FIG. 7B shows a comparative example, and corresponds to a graph of the data voltage Vdata applied to the driving transistor DRT according to the maximum black data voltage Vmaxblack without considering the optimal data voltage Vdata for each sensing mode of FIG. 5. ② corresponds to a change graph of the data voltage Vdata of the driving transistor DRT according to the maximum black data voltage Vmaxblack considering the optimal data voltage Vdata for each sensing mode of FIG. 5.

Referring to ① of FIG. 7B, the data voltage Vdata applied to the driving transistor DRT is constant regardless of the maximum black data voltage Vmaxblack. Referring to ② of FIG. 7B, the data voltage Vdata applied to the driving transistor DRT is constant regardless of the maximum black data voltage Vmaxblack, and is the same as the voltage level of the data voltage Vdata of ①.

Referring to FIGS. 2 and 7A to 7C, the initialization voltage VINT of the driving transistor DRT of the case where the optimal initialization voltage VINT for each sensing mode is considered may be decreased compared to the case where the optimal initialization voltage VINT for each sensing mode is not considered, and the data voltage Vdata applied to the driving transistor DRT is constant regardless of the maximum black data voltage Vmaxblack. In response to this, the gate-source voltage VGS of the driving transistor DRT of the case where the optimal initialization voltage VINT for each sensing mode is considered is greater than that of the case where the optimal initialization voltage VINT for each sensing mode is not considered.

That is, when a condition in which the gate-source voltage VGS of the driving transistor DRT varies, the initialization voltage VINT may be decreased by maintaining the data voltage Vdata constant.

Consequently, since the voltage level of the initialization voltage VINT is decreased, the voltage charged in the parasitic capacitor Cel may be rapidly discharged. When the initialization voltage VINT is decreased, an amount of current flowing from the first node N1 to the initialization voltage line IVL is increased. In this case, since the capacitor Crvl is charged to a desired voltage at a high speed, a sensing time (a real sensing time), which is a time required to sense the characteristic value of the driving transistor DRT, may be reduced. In addition, since the sensing time (real sensing time) is reduced, a sensing period may be shortened, and thus the characteristic value of the driving transistor DRT may be quickly sensed.

Hereinafter, a process in which a sensing period is reduced using determined initialization voltage and data voltage according to an embodiment of the disclosure is described with reference to FIG. 8.

Figure 8:
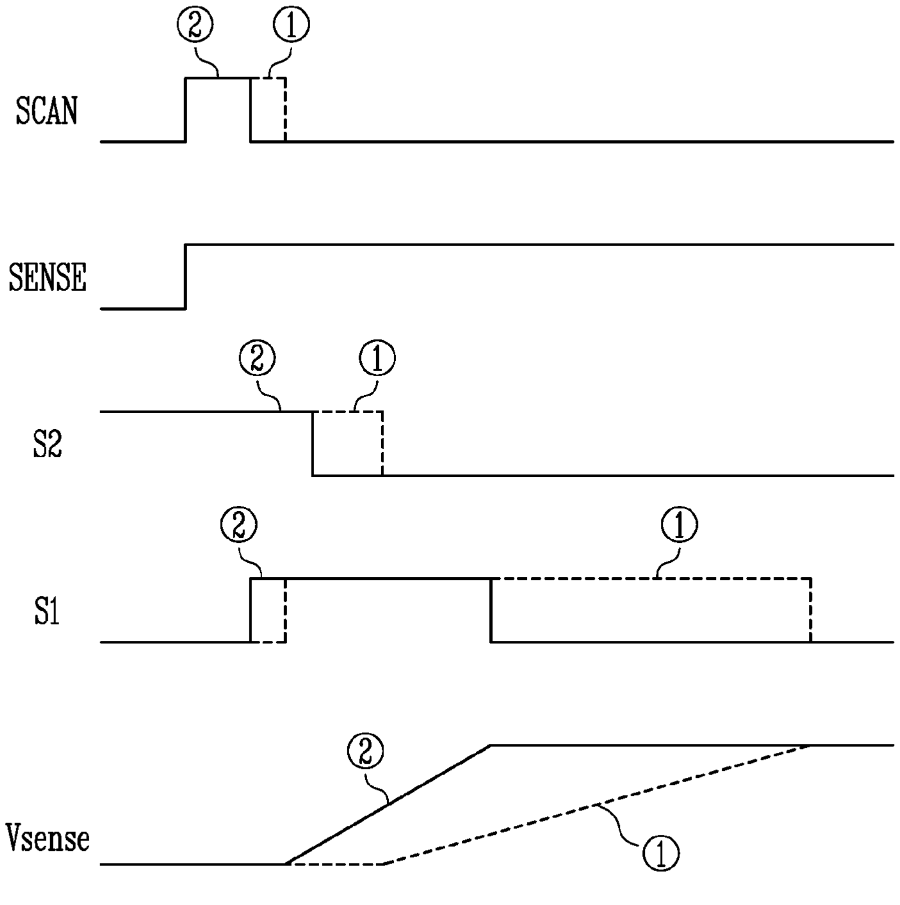
FIG. 8 is a diagram illustrating a process in which a sensing period is reduced using a determined initialization voltage and a determined data voltage according to an embodiment of the disclosure.

FIG. 8 is a diagram illustrating a process in which a sensing period is reduced using a determined initialization voltage and a determined data voltage according to an embodiment of the disclosure.

① of FIG. 8 is a diagram illustrating a sensing period without considering the optimal initialization voltage VINT and data voltage Vdata for each sensing mode of FIG. 5. ② of FIG. 8 is a diagram illustrating a sensing period considering the optimal initialization voltage VINT and data voltage Vdata for each sensing mode of FIG. 5.

Referring to FIGS. 2, 6A to 6C, 7A to 7C and 8, the initialization voltage VINT of a case where the maximum black data voltage Vmaxblack is not considered is set to be higher than that of a case where the maximum black data voltage Vmaxblack is considered.

Specifically, when the second transistor T2 is in an on state due to the scan signal SCAN applied to the gate electrode, the first transistor T1 is in an on state due to the sense signal SENSE applied to the gate node, the switch S1 is disconnected and switch S2 is in an on state, the voltage charged in the parasitic capacitor Cel may be discharged to a node of the initialization voltage VINT through the first transistor T1.

At this time, since the voltage level of the initialization voltage VINT is decreased in the case of ② considering the maximum black data voltage Vmaxblack compared to ① of FIG. 8, a voltage difference between the first node N1 and the node 220 increases. Therefore, since the amount of current flowing from the first node N1 to the node of the initialization voltage VINT through the first transistor T1 increases, a sensing period may be reduced as the real sensing time is reduced. Therefore, a period in which the scan signal SCAN is applied to the gate electrode of the second transistor T2 and a period in which the sense signal SENSE is applied to the gate electrode of the first transistor T1 may be reduced.

In addition, when the second transistor T2 is in an off state, the first transistor T1 is in an on state due to the sense signal SENSE applied to the gate node, and the switch S2 and the switch S1 are in an on state, a current may flow to the node 220 and the node 210 due to the voltage charged in the parasitic capacitor Cel.

That is, the current may flow through the first transistor T1 to the node of the initialization voltage VINT and the node 210 connected to the analog-to-digital converter ADC.

At this time, since the amount of current flowing from the first node N1 to the initialization voltage line IVL through the first transistor T1 increases due to the decreased initialization voltage VINT, a period in which the switches S1 and S2 are turned on or turn off may be shortened (that is, the sensing period may be reduced).

In addition, when the second transistor T2 is in an off state, the first transistor T1 is in an on state due to the sense signal SENSE applied to the gate node, the switch S2 is in an off state, and the switch S1 is in an on state, an amount of current flowing through the node 210 to the capacitor Crvl increases. That is, a voltage may be quickly charged in the capacitor Crvl, and a slope of the voltage Vsense, which is a voltage across the capacitor Crvl, may increase. Therefore, the entire real sensing time of the case of ② considering the maximum black data voltage Vmaxblack may be reduced compared to ①.

Hereinafter, an initialization voltage and a data voltage according to a maximum black data voltage in a frame (or frame period) according to an embodiment of the disclosure is described with reference to FIG. 9.

Figure 9:
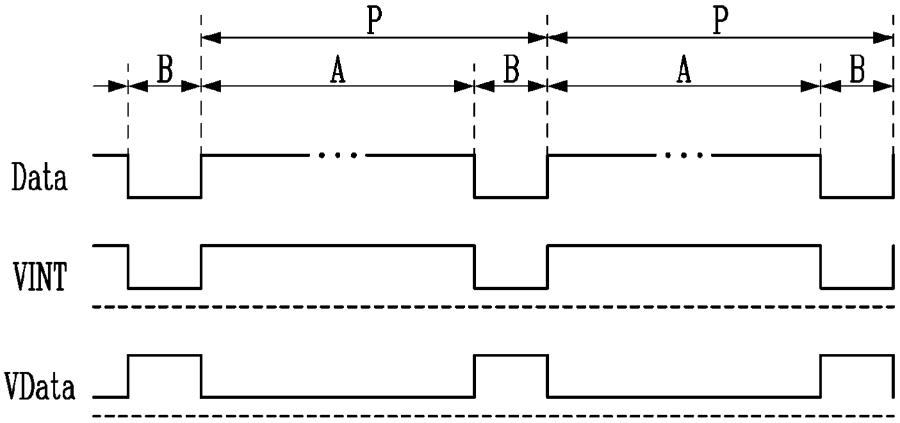
FIG. 9 is a diagram illustrating an initialization voltage and a data voltage according to a maximum black data voltage in a frame according to an embodiment of the disclosure.

FIG. 9 is a diagram illustrating an initialization voltage and a data voltage according to a maximum black data voltage in a frame (or frame period) according to an embodiment of the disclosure.

One frame P period may include an active period A and a blank period B. The blank period B may be a remaining period after the data driver 120 finishes supplying the data voltages in each active period A of each frame P period. In an embodiment, the pixels receive data voltages in the active period A and the pixels do not receive data voltages in the blank period B.

In an embodiment, in the blank period B, the initialization voltage VINT and the data voltage Vdata determined by the initialization voltage operator 142 and the data voltage operator 143 are supplied to the driving transistor DRT in the pixel PX.

In an embodiment, in the blank period B, a voltage having a level of a sum of the maximum black data voltage and the margin value when measuring the threshold voltage Vth according to Equation 2 is supplied as the initialization voltage VINT to the driving transistor DRT in the pixel PX. In an embodiment, a voltage having a level of a sum of the maximum black data voltage and the gate-source voltage VGS setting value when measuring the threshold voltage Vth according to Equation 5 is supplied as the data voltage Vdata to the driving transistor DRT in the pixel.

In an embodiment, in the blank period B, a voltage having a level of a sum of the maximum black data voltage and the margin value when measuring the mobility u according to Equation 3 is supplied as the initialization voltage VINT to the driving transistor DRT in the pixel PX. In addition, a voltage having a level of a sum of the maximum black data voltage and the gate-source voltage VGS setting value when measuring the mobility u according to Equation 6 may be supplied as the data voltage Vdata to the driving transistor DRT in the pixel.

In addition, in the blank period B, a voltage having a level of a sum of the maximum black data voltage and the margin value when measuring the characteristic value el according to Equation 4 may be supplied as the initialization voltage VINT to the driving transistor DRT in the pixel PX. In addition, a voltage having a level of a sum of the maximum black data voltage and the gate-source voltage VGS setting value when measuring the characteristic value el according to Equation 7 may be supplied as the data voltage Vdata to the driving transistor DRT in the pixel.

According to an embodiment of the disclosure, the initialization voltage VINT and the data voltage Vdata for each sensing mode may be calculated in consideration of the maximum black data voltage, and the initialization voltage VINT and the data voltage Vdata may be supplied to the driving transistor DRT in the pixel PX in the blank period B. As discussed above, since the initialization voltage VINT is decreased, a measurement period of the threshold voltage Vth of the driving transistor DRT, a measurement period of the mobility u, and the entire sensing period may be reduced. In addition, since the sensing period is reduced, the sensing period is shortened, and degradation of circuit elements included in each pixel PX may be quickly prevented.

In other words, the initialization voltage VINT supplied to the pixel PX after a first time has elapsed (a time point at which the blank period B is started) may be set to a first voltage value, and the initialization voltage VINT supplied to the pixel PX after a second time different from the first time has elapsed (a time point at which the active period A is started) may be set to a second voltage value different from the first voltage value. At this time, the first voltage value is lower than the second voltage value.

In addition, the data voltage Vdata supplied to the pixel PX after the first time has elapsed (the time point at which the blank period B is started) may be set to a third voltage value, and the data voltage Vdata supplied to the pixel PX after the second time different from the first time has elapsed (the time point at which the active period A is started) may be set to a fourth voltage value different from the third voltage value. At this time, the third voltage value is higher than the fourth voltage value.

Hereinafter, an initialization voltage and a data voltage according to a maximum black data voltage in a frame according to an embodiment of the disclosure is described with reference to FIG. 10.

Figure 10:
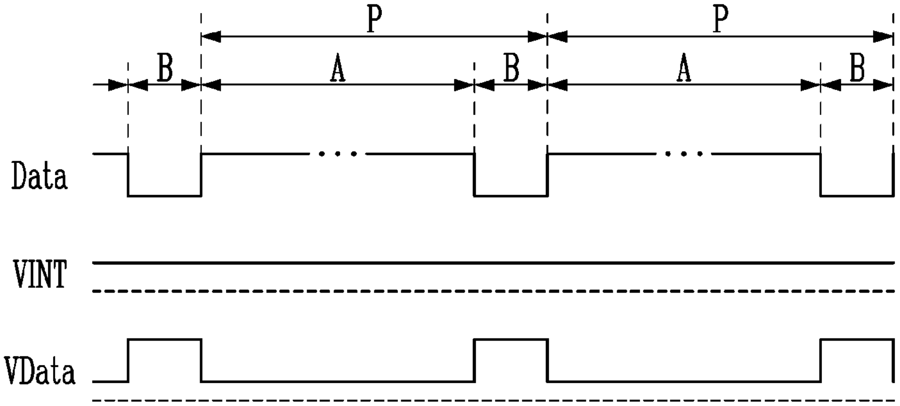
FIG. 10 is a diagram illustrating an initialization voltage and a data voltage according to a maximum black data voltage in a frame according to an embodiment of the disclosure.

FIG. 10 is a diagram illustrating an initialization voltage and a data voltage according to a maximum black data voltage in a frame (or frame period) according to an embodiment of the disclosure.

Differently from FIG. 9, in FIG. 10, the initialization voltage VINT determined for each characteristic value is supplied to the driving transistor DRT in the pixel PX during the active period A and the blank period B included in one frame period P. In addition, the data voltage Vdata determined for each characteristic value is supplied to the driving transistor DRT in the pixel PX during the blank period B included in one frame period P.

In an embodiment, in the blank period B and the active period A, the voltage having the level of the sum of the maximum black data voltage and the margin value when measuring the threshold voltage Vth according to Equation 2 is supplied as the initialization voltage VINT to the driving transistor DRT in the pixel PX. In addition, in the blank period B, the voltage having the level of the sum of the maximum black data voltage and the gate-source voltage VGS setting value when measuring the threshold voltage Vth according to Equation 5 is supplied as the data voltage Vdata to the driving transistor DRT in the pixel.

In an embodiment, in the blank period B and the active period A, the voltage having the level of the sum of the maximum black data voltage and the margin value when measuring the mobility u according to Equation 3 is supplied as the initialization voltage VINT supplied to the driving transistor DRT in the pixel PX. In an embodiment, in the blank period B, the voltage having the level of the sum of the maximum black data voltage and the gate-source voltage VGS setting value when measuring the mobility u according to Equation 6 is supplied as the data voltage Vdata to the driving transistor DRT in the pixel.

In an embodiment, in the blank period B and the active period A, the voltage having the level of the sum of the maximum black data voltage and the characteristic value margin value according to Equation 4 is supplied as the initialization voltage VINT to the driving transistor DRT in the pixel PX. In addition, the voltage having the level of the sum of the maximum black data voltage and the gate-source voltage VGS setting value when measuring the characteristic value el according to Equation 7 may be supplied as the data voltage Vdata to the driving transistor DRT in the pixel.

According to an embodiment of the disclosure, the initialization voltage VINT and the data voltage Vdata for each sensing mode may be calculated in consideration of the maximum black data voltage, and the calculated initialization voltage VINT may be supplied to the driving transistor DRT in the pixel PX in the blank period B and the active period A. In addition, the calculated data voltage Vdata may be supplied to the driving transistor DRT in the pixel PX in the blank period B.

Compared to FIG. 9 according to an embodiment of the disclosure, the initialization voltage VINT for each sensing mode is supplied in not only the blank period B but also in the active period A. As discussed above, since the initialization voltage VINT is decreased in not only the blank period B but also the active period A, the measurement period of the threshold voltage Vth of the driving transistor DRT, the measurement period of the mobility u, and the entire sensing period may be further reduced in the sensing period in the blank period B and the sensing period in the active period A. In addition, since the sensing period is further reduced, the sensing period is further shortened, and degradation of the circuit elements included in each pixel PX may be quickly prevented.

According to an embodiment of the disclosure, a display device includes a sensor, a timing controller, and a data driver. The sensor is configured to sense characteristic values of a circuit element included in a pixel of the display device using an input initialization voltage and an input data voltage supplied to the pixels. The timing controller is configured to calculate a compensation data voltage using the characteristic values, and calculate an adjusted initialization voltage and an adjusted data voltage by using the compensation data voltage. The data driver is configured to output the adjusted initialization voltage and the adjusted data voltage to the pixels.

At least one embodiment of the disclosure provides a display device configured sense threshold voltages of driving transistors of pixels of the display device, sense mobilities of the driving transistors, sense characteristics of light emitting diodes of the pixels, generate a compensation voltage from these three different types of sensed data, adjust initialization voltages and adjust data voltages based on the compensation voltage, and apply the adjusted voltages to the pixels.

Although the embodiments have been described with reference to the accompanying drawings above, those of ordinary skill in the art to which the embodiment belongs understand that the embodiment mays be various modified and changed without departing from the technical spirit of the accompanying claims.

What is claimed is:

1. A display device comprising:

a pixel;

a sensor to sense characteristic values of a circuit element of the pixel in a sensing period of a frame period; and a controller to adjust an initialization voltage supplied to the pixel based on the characteristic values and a margin value of the initialization voltage, wherein after a first time is elapsed, the initialization voltage supplied to the pixel in the sensing period is set to a first voltage value, after a second time different from the first time is elapsed, the initialization voltage supplied to the pixel is set to a second voltage value greater than the first voltage value.

2. The display device of claim 1, wherein: the controller is configured to further adjust a data voltage based on the characteristic values of the circuit element of the pixel; and after the first time is elapsed, the data voltage supplied to the pixel during the sensing period is set to a third voltage value, after the second time is elapsed, the data voltage supplied to the pixel is set to a fourth voltage value different from the third voltage value, the third voltage value being higher than the fourth voltage value.

3. The display device of claim 1, wherein the frame period comprises an active period and a blank period, and the blank period comprises the sensing period.

4. The display device of claim 2, wherein:

the initialization voltage having the first voltage value is supplied to the pixel in the sensing period of the frame period; and the initialization voltage having the second voltage value is supplied to the pixel in the active period of another frame period following the frame period.

5. The display device of claim 1, wherein the pixel comprises:

a light emitting diode connected to a first node;

a first transistor connected between a first power source and the first node, and having a gate electrode connected to a second node; and a second transistor connected between a data line and the second node, and wherein the initialization voltage is supplied to the first node, and the data voltage is supplied to the second node through the data line and the second transistor.

6. The display device of claim 5, wherein the characteristic values include a threshold voltage of a first transistor, a mobility of the first transistor, and a characteristic value of the light emitting diode.

7. The display device of claim 6, wherein the controller is configured to support a plurality of sensing modes including a first sensing mode to sense the threshold voltage of the first transistor, a second sensing mode to sense the mobility of the first transistor, and a third sensing mode to sense the characteristic value of the light emitting diode.

8. The display device of claim 1, wherein the controller is configured to calculate a compensation data voltage using the characteristic values, and adjust the initialization voltage based on the compensation data voltage.

9. The display device of claim 8, wherein the initialization voltage is adjusted based on the compensation data voltage and the margin value associated with a mode of the controller.

10. The display device of claim 8, wherein the initialization voltage decreases as the compensation data voltage increases.

11. The display device of claim 1, further comprising a data driver to output the initialization voltage and the data voltage in response to control signals of the controller.

12. A display device comprising:

a pixel;

a sensor to sense characteristic values of a circuit element of the pixel by using an initialization voltage and a data voltage supplied to the pixel in a sensing period of a frame period; and a controller to adjust the initialization voltage based on the characteristic values, wherein after a first time is elapsed, the initialization voltage supplied to the pixel in the sensing period is set to a first voltage value, after a second time different from the first time is elapsed, the initialization voltage supplied to the pixel is set to a second voltage value different from the first voltage value, the first voltage value being lower than the second voltage value, wherein the controller is configured to calculate a compensation data voltage using the characteristic values, and adjust the initialization voltage based on the compensation data voltage, and wherein the initialization voltage is adjusted based on the compensation data voltage and a margin value associated with a mode of the controller.

* * * * *